Feb. 12, 1957 R. A. WATSON 2,781,116
COMBINED ACCELERATION AND DECELERATION CONTROL
Filed Nov. 5, 1954 2 Sheets-Sheet 1
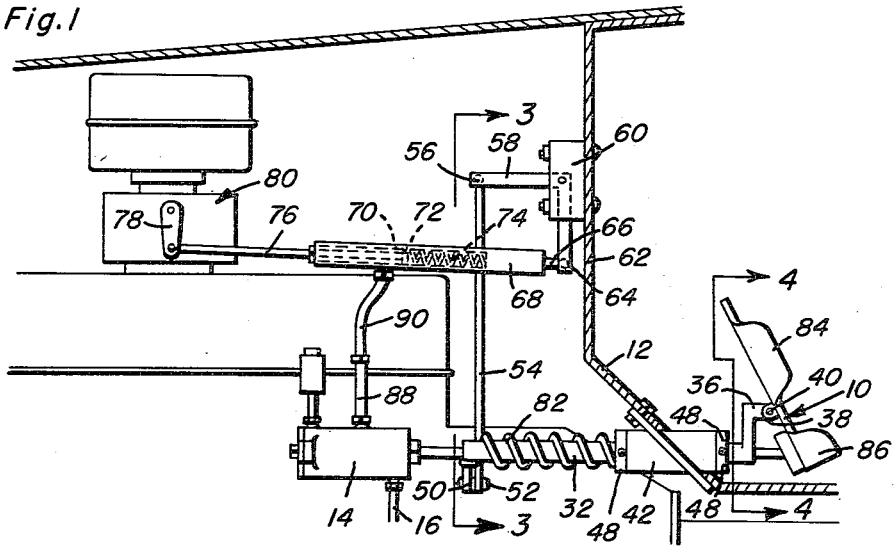
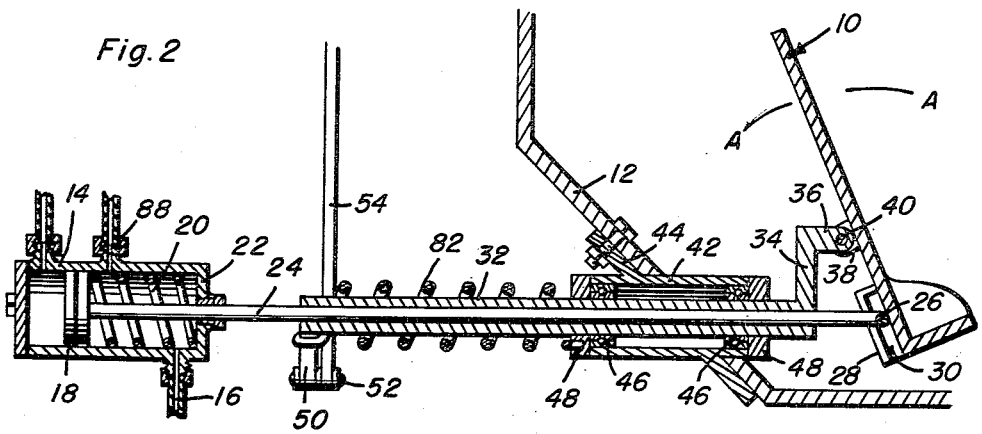
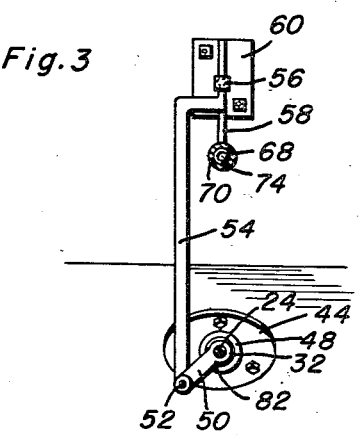
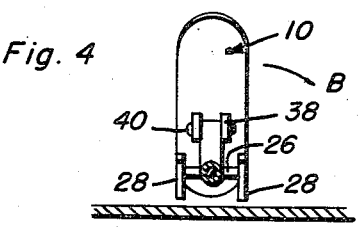
Richard A. Watson
INVENTOR
BY Frank C. Maley
AGENT

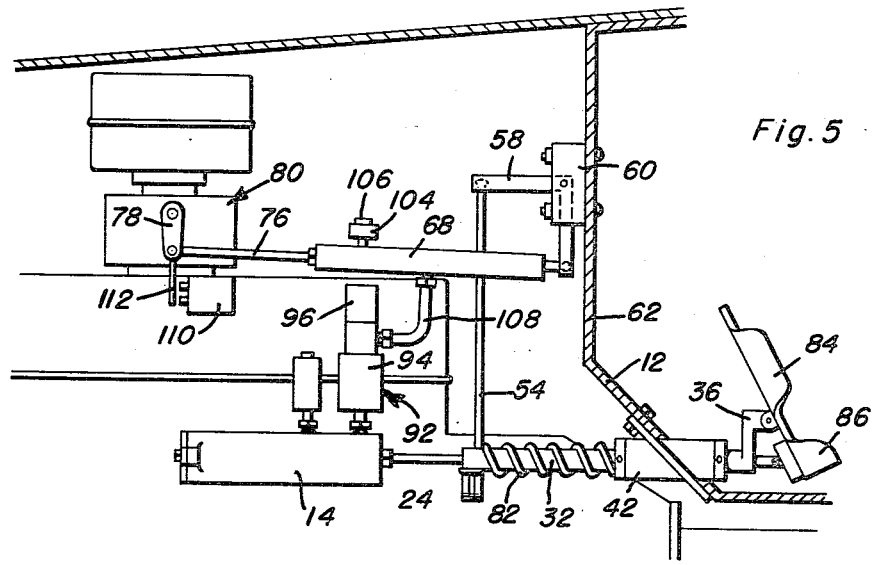
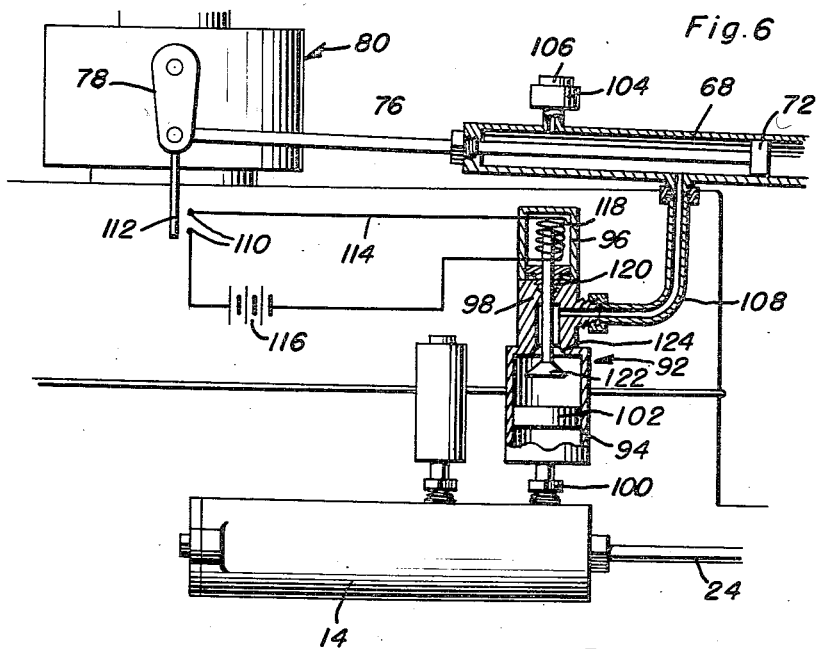
Richard A. Watson
INVENTOR

United States Patent Office 2,781,116
Patented Feb. 12, 1957

2,781,116

COMBINED ACCELERATION AND DECELERATION CONTROL

Richard A. Watson, Chatellerault, France

Application November 5, 1954, Serial No. 467,030

4 Claims. (Cl. 192—3)

This invention relates to a means for operating the fuel metering device and the brake system of a combustion engine vehicle and is particularly directed to a novel combination accelerator and brake system for vehicles of all types.

The primary object of this invention resides in the provision of a single pedal operated means for controlling both the acceleration and deceleration (braking) of a vehicle and in the mounting of the pedal so that it can be simply and conveniently operated to control the acceleration and deceleration of the vehicle.

Prior devices, directed to a combined acceleration and deceleration control of a vehicle, offer only a partial solution to the problem of acceleration and deceleration and such devices are either too expensive for installation in the mass-production of vehicles or too complicated for quick and safe use. In this respect, such a device must be simple for quick, safe use and must be built in a manner so that dependable, safe and efficient operation is ensured; thus, it must be simple and safe from a mechanical and operational viewpoint.

In most respect, prior devices are based on foot movement of a nature foreign to and not easily assimilable to the immediate psychological reaction of an average driver. The similarity, which is present, between both accelerative and decelerative movements creates a definite danger factor.

The main purpose of the present invention is to eliminate insofar as possible the time lag between the specific instant when the driver senses the situation and wishes to decelerate or apply the brakes and the instant when the decelerative or braking motion is actually initiated.

Another object of the present invention is to provide a single pedal which is mounted for movement in two transversely intersecting planes and which is easily moved in either of such planes to control the acceleration and deceleration of a vehicle.

A further object of this invention is to provide a rotatable member which through a connecting means actuates the fuel metering device to control the acceleration of a vehicle, the rotatable member being rotated by the pedal which is moved curvilinearly in a plane substantially transverse to the axis of the vehicle and being automatically returned to an inoperative position when side pressure on the pedal is released.

A further object of this invention is to provide means actuated by the pedal in executing a movement toward the floor board or longitudinally of the axis of the vehicle for controlling the operation of the master brake cylinder and for simultaneously closing off the fuel metering device.

A further object of this invention is to provide a compact and simple single pedal operated means whereby the brakes of a vehicle may be instantly applied at any speed without giving any thought to releasing the accelerator, since the engine will in all cases be slowed to a suitable degree, consonant with the degree of brake application, automatically.

These and ancillary objects are attained by this invention, the preferred embodiment of which is set forth in the following description and illustrated in the accompanying drawing, wherein;

Fig. 1 is a side elevational view of the single pedal operated acceleration and deceleration system;

Fig. 2 is a detailed longitudinal sectional view of the pedal operated cylinders;

Fig. 3 is a vertical transverse sectional view taken on line 3—3 of Fig. 1,

Fig. 4 is a vertical sectional view taken on line 4—4 of Fig. 1,

Fig. 5 is a side elevational view of the system of Fig. 1, with a separate circuit arrangement for the brake system and fuel metering device, and Fig. 6 is a view similar to Fig. 5 with portions of the system broken away and shown in sections.

Referring now more particularly to the drawing and initially to Figs. 1–4, the numeral 10 designates the combined braking and accelerating pedal, which is mounted to swing curvilinearly in an arcuate plane A—A toward 3 and away from the floor board 12 in executing its brake applying movements. The pedal is thus pivoted to swing longitudinally of the axis of the vehicle and is moved down toward the floor board to apply the brakes. In this respect, a master brake cylinder 14 is provided in its conventional relation to the wheel cylinders and has a brake line 16 at its rear end portion leading to the wheel cylinders (not shown). A piston 18 is workingly disposed in the cylinder 14 to force the hydraulic fluid through the line 16 and is normally retained in its forward, inoperative position by a spring 20 which bears against the rear face of the piston and the inner face of the rear end 22 of the cylinder. A piston rod 24 is provided for the piston and slidably and sealingly extends through the rear end 22 of the cylinder. The rod 24 extends through the floor board and terminates in a lateral pin 26 which slides in an axial channel formed by lateral depending flanges 28 on the side edges of the underside of the lower end portion of the pedal, the ends of the pin 26 being slidably received in axial grooves 30 on the inside of the flanges.

An elongated hollow shaft 32 is freely circumposed on the piston rod 24 and has a laterally extending, upstanding inner end 34 which terminates in a transversely apertured, rearwardly offset end 36. The underside of the pedal, intermediate the ends thereof and more adjacent the lower end, is formed with apertured ears 38 which receive the end 36 and are pivoted thereto by a pivot pin 40.

The shaft is mounted for rotation inside a cylinder 42 which has an annular flange 44 which is bolted to the underside of the inclined front of the floor board. The ends of the cylinder 42 house ball bearing units 46 within which the shaft rotates and the shaft is provided with washer elements 48 which are fixedly circumposed thereon and abut the ends of the cylinder 42 to locate the shaft against axial movement.

The shaft 32 is rotated in an anti-clockwise direction by a curvilinear movement of the pedal 10 in a direction transverse to the axis of the vehicle and in the direction of the arrow B of Fig. 4. The shaft has a laterally offset arm 50 on its outer end and the arm 50 is pivoted by a pin 52 to a rod 54 which extends upwardly from the shaft 32. The upper end of the rod 54 is attached by a ball and socket joint 56 to one end of a bell crank 58. The juncture of the bell crank is pivotally attached to a mounting block which is fastened on the inside of the fire wall 62. The other end of the bell crank is attached by a ball and socket joint 64 to an axial end extension 66 of a cylinder 68. The cylinder 68 contains a hydraulic chamber 70 within which a piston 72 is workingly disposed. Behind the piston a spring 74 is positioned and a piston rod 76 slidingly and sealingly projects forwardly of the forward end of the cylinder. The outer end of the rod 76 is pivotally attached to the arm 78 of a carburetor 80, or other type of fuel metering device.

A helical spring 82 is wrapped around the outer end portion of the shaft and has one end attached to the front washer 48 and its other end attached to the arm 50 so as to resist the turning of the shaft and to urge it back to its inoperative position when the pressure of the pedal is released. In this respect, the pedal has an upstanding side flange or plate 84 against which the side of the foot can be pressed to swing the pedal sideways and rotate the shaft. The pedal is formed at its lower end with a heel rest 86 to comfortably locate the foot on the pedal.

A connection 88 extends laterally from the master cylinder 14 not in alignment with the line 16 and is connected by a flexible line 90 to the chamber 70.

*Operation of system*

In use, the driver rests his foot on the pedal 10 and, to accelerate the engine, applies side pressure against the plate 84 in a movement to the left. (Such movement may also be to the right by a change in the relationship of spring 82 and arm 50 and positioning of plate 84 on the right side edge of the pedal.) The sideways movement of the pedal causes the shaft 32 to rotate in an anti-clockwise direction with the end 36 of the shaft being directly rotated by the pedal. The rotation of the shaft will produce a rotation of the arm 50 and the rod 54 will be pushed upwardly. The upward movement of the rod 54 will swing the crank 58 about its pivot and push the cylinder 68 forwardly. The forward movement of the cylinder will be transmitted to the piston rod 76 by the piston 72 and the spring 74. In this respect, the spring is made sufficiently strong to resist any compressive action due to the resistance of the arm 78 and any pressure applied at the end 66 of the cylinder. The spring 74 will be compressed only when the proper amount of fluid pressure acts on the piston 72 from the cylinder 14 through the connection 88 and line 90.

It can thus be seen that the lateral or sideways motion of the pedal 10 will, through the shaft 32 and linkage 50, 54, 58 and 68—76, be transmitted to the arm 78. As pressure is increased against the plate 84 of the pedal, an increase in accelerative movement will be produced.

In order to shift speeds, the driver will momentarily decrease such pressure on the pedal 10 and the helical spring 82 will automatically return the pedal and the linkage to a normal, inoperative position. As soon as the next higher speed is engaged, the driver will move his foot against the plate 84 to accelerate.

When it is desired to apply the brakes, the driver will impose a downward pressure on the pedal, which will pivot about the pivot 40. The upper part of the pedal will swing forwardly and the lower part will swing rearwardly and upwardly, the latter movement being accommodated by the slidable mounting of the pin 26. The pin 26 will slide toward the lower end of the pedal so that the shaft 32 and rod 24 maintain their proper positions. The rod 24 will be pulled rearwardly and move the piston 18 rearwardly in the cylinder, such movement forcing hydraulic fluid through the brake line 16 and through the connection 88 and line 90. The piston 72 will be forced rearwardly and pull the rod 76 to move the arm 78 to a closing position.

For a given downward pressure exerted on the pedal 10 to pivot it about the pivot 40, there will be a corresponding pressure exerted on the brakes and on the piston 72 causing compression of the spring 74 and retraction of the piston rod 76, with a corresponding action on the fuel supply through the arm 78. Thus, when the brakes are applied to any given degree, the engine will be decelerated to a corresponding degree.

Upon releasing downward pressure on the pedal 10, there being no lateral movement of the pedal, the hydraulic pressure will be vacated and the braking action will cease and the spring 74 will be decompressed, the result being that the engine will be accelerated at the speed it had originally before the braking action commenced. In other words, the spring will push the piston rod and arm 78 back to the positions they occupied before the braking action was commenced. Thus, assuming that the pedal is in a lateral position of twenty mile engine speed, that is, producing through the linkage a position of the cylinder, rod 76 and arm 78 as a mechanical linkage whereby the engine is being accelerated at a speed of twenty miles, and the pedal is then depressed, without being moved laterally, the cylinder 68 will remain in its position but the rod 76 will be moved rearwardly by the hydraulic pressure. When the pressure is released, the spring 74 will return the rod to its original position.

In the event that a lateral movement is given to the pedal 10 while braking action is taking place and the pedal is allowed to return to its inoperative position, upon releasing the brakes, the engine would be in an idling stage.

Instead of the direct connection between the master cylinder and the cylinder 68, a separate hydraulic circuit, indirectly controlled by the master brake cylinder, could be used and such separate circuit system is shown in Figs. 5 and 6, wherein the reference numerals identifying the parts in Figs. 1–4 are used for the same parts.

As shown in Figs. 5 and 6, the cylinder 14 is connected to the cylinder 68 by a vertically disposed housing 92 which includes a lower cylinder 94 and an upper cylinder 96, the cylinders being connected by a longitudinal bore 98. The lower closed end of the cylinder 94 is connected by a fitting 100 to the cylinder 14. Such fitting and housing replace the connection 88 of Fig. 1. A piston 102 is disposed transversely in the cylinder 94 and divides the cylinder so that the hydraulic fluid from the master cylinder 14 acts directly on the lower face of the piston but is prevented by the piston from entering the bore 98.

The cylinder 68 is provided with a small tank 104 which has a fill cap 106 and which overlies the cylinder and permits replenishment of the hydraulic fluid acting on the piston 72. The cylinder 68 is connected to the cylinder 94 by a tube 108 and the fluid in the cylinder 68, tube 108 and upper portion of the cylinder 94, above the freely movable piston 102, is supplied by way of the tank 104.

It can be seen that two separate fluid circuits are provided, one being the circuit for the brake system and the other being the circuit for the piston 72. The pressure of the fluid in the master cylinder, under the movement of the piston in the brake cylinder 14, acts on the piston 102 to move the piston upwardly and thereby act on the fluid in the separate circuit, which actuates the piston 72. The housing 92, cylinders 94, 96 and connecting lines may be horizontally disposed or inclined.

By virtue of the separate circuits, the possibility of air bubbles forming in the main hydraulic system or braking circuit is prevented. In this respect, since the greater part of the hydraulic system actuating the fuel metering device is on a higher level than the level of the conventional hydraulic braking circuit and the fluid reservoir of that circuit, it is possible with a single circuit that air bubbles may form in the main hydraulic system. To obviate such possibility, the separate circuit arrangement may be used.

In addition, instead of the separate hydraulic circuit, the piston 72 could be actuated by the manifold vacuum. Also, instead of the mechanical linkage between the pedal and the arm to cause acceleration, a separate system based on the same principle could be used.

To avoid the possibility of the engine being choked by the complete closing off of the fuel metering device, means may be provided to permit braking without exerting pressure on the piston 72 and imparting movement to the arm 78, when the engine is in an idling stage.

In this respect, an electrical switch 110 is positioned in proximity to the arm 78, so that a projection 112 carried by the arm will actuate the switch which controls an electrical circuit 114, which includes a battery source of electrical energy 116. A solenoid or electromagnet 118 is included in the circuit and is mounted in the upper cylinder 96. The solenoid is operatively associated with the stem 120 of a valve 122 that seats in a valve seat 124 formed in the upper end of the lower cylinder 94 at the bore 98, in which the stem 120 is axially displaceable.

When the solenoid is energized by the closing of the switch, under the actuation of the projection 112, the valve 122 is seated in the seat 124 and closes off bore to prevent the imposition of further pressure on the fluid in the secondary circuit. Thus, when the movement of the arm 78 reaches the point where the fuel metering device is closed to the point of the engine being in an idling stage, the solenoid is energized to close the valve and prevent the piston 72 and rod 76 from being moved any further whereby the arm 78 is not moved any further.

Such control may be used with the single circuit of Figs. 1–4 or with the two separate circuit arrangement of Figs. 5 and 6, as shown.

Thus, since it is obvious that various modifications and changes may be effected without departing from the main principle of my single pedal control, limitation is sought only in accordance with the scope of my invention as defined in the attached claims.

Having thus described this invention, what is claimed is:

1. A combined accelerating and decelerating control means for a vehicle having a fuel metering device for an internal combustion engine and a hydraulic brake system including a master cylinder; said control means comprising a single pedal, means connecting the pedal to the master cylinder for actuation of the piston therein responsive to movement of the pedal, means connecting the pedal to the fuel metering device for actuation thereof by the pedal in a movement separate from the movement actuating the piston in the master cylinder, said last means including a cylinder, a piston working in the cylinder and having a piston rod connected to the fuel metering device, said cylinder, piston and piston rod being commonly movable under actuation of the pedal to control the fuel metering device and means establishing fluid pressure communication between the master cylinder and the cylinder so that upon actuation of the piston in the master cylinder, the piston in the cylinder is moved by fluid pressure to move the piston rod independent of the cylinder and close off the fuel metering device, wherein valve means is interposed in said means establishing fluid pressure communication between the master cylinder and the cylinder and means including an electrical circuit and solenoid controlling the seating of said valve means and a switch actuated by extreme movement of said piston rod in the cylinder controlling the energization of the solenoid so that the valve is closed when the fuel metering device is almost rendered inoperative by movement of the piston rod whereby the engine is maintained in an idling stage.

2. A control means as claimed in claim 1, wherein means is provided for limiting the extent of closing movement of the piston rod in actuation of the fuel metering device so as to maintain the fuel metering device in minimum operation for the maintenance of the engine in an idling stage.

3. A control means as claimed in claim 1, wherein said means establishing fluid pressure communication between the master cylinder and cylinder includes a fluid connection between said parts and a freely movable piston in said connection closing off the flow of fluid from the master cylinder through the connection and being acted upon on one face by the fluid pressure in the master cylinder and means for providing a separate fluid circuit in the cylinder which circuit is responsive to the movement of the freely movable piston by the fluid pressure in the master cylinder.

4. A control means as claimed in claim 1, wherein said means establishing fluid pressure communication between the master cylinder and the cylinder includes a connecting means between said parts, a partition member transversely interposed in said connecting means and closing off the flow of fluid from the master cylinder while responding to the pressure thereof exerted on one side and means for establishing a separate fluid circuit in the connection on the opposite side of said partition member which circuit is controlled by the movements of the partition member in response to the pressure of the fluid in the master cylinder.

References Cited in the file of this patent
UNITED STATES PATENTS

| | | |
|---|---|---|
| 2,181,883 | Gibson | Dec. 5, 1939 |
| 2,229,055 | Dick | Jan. 21, 1941 |
| 2,338,244 | Hayes | Jan. 4, 1944 |
| 2,423,006 | Chambers et al. | June 24, 1947 |
| 2,621,766 | Patrick | Dec. 16, 1952 |